(No Model.)
2 Sheets—Sheet 1.
D. WISE.
SEED PLANTER.
No. 277,397.
Patented May 8, 1883.
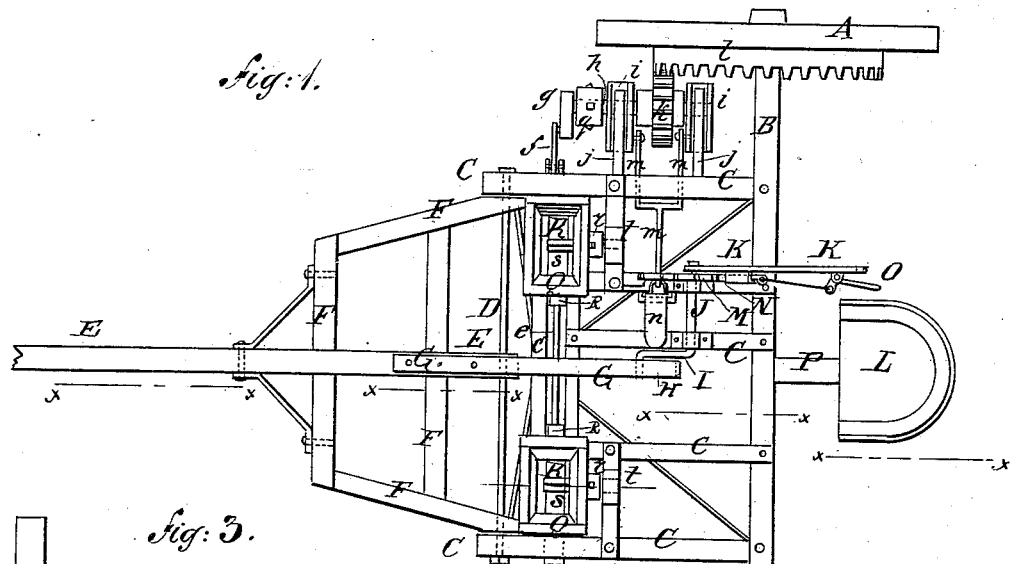
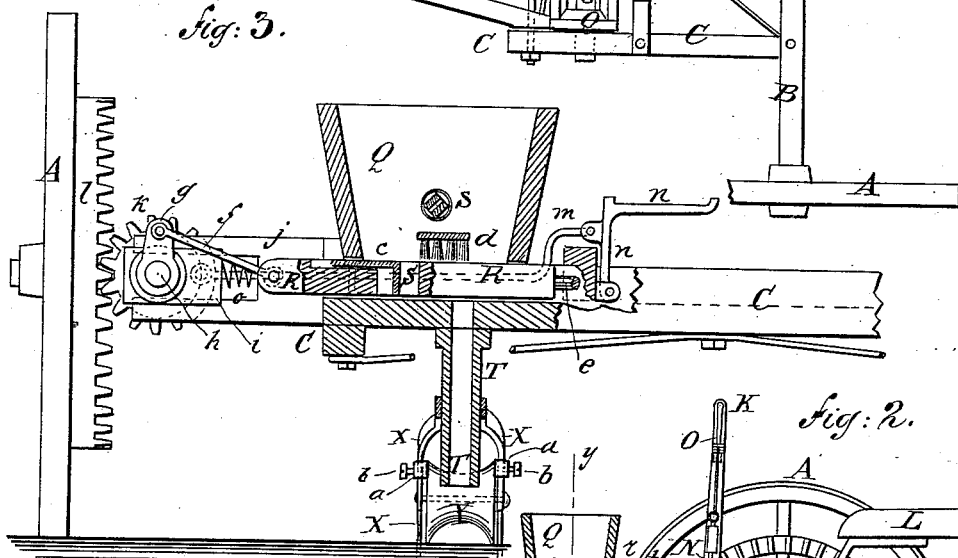
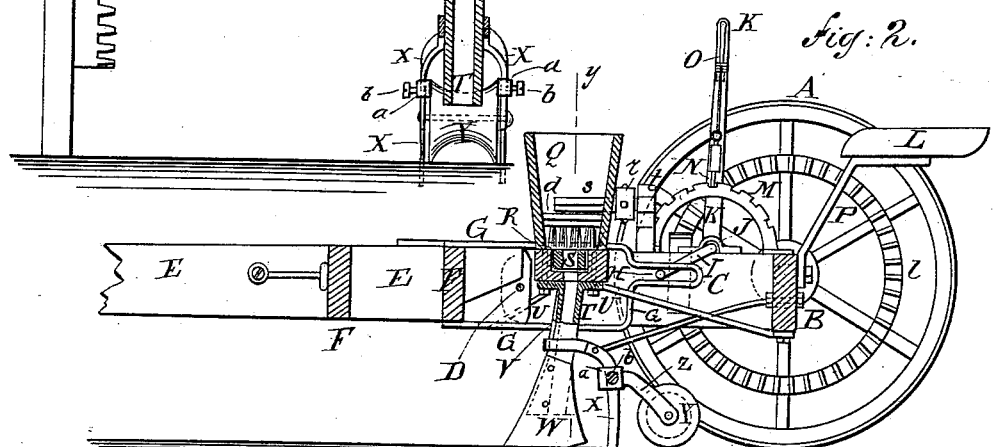
WITNESSES:
INVENTOR:

(No Model.) 2 Sheets—Sheet 2.

D. WISE.
SEED PLANTER.

No. 277,397. Patented May 8, 1883.

WITNESSES:
Chas. Nida
C. Sedgwick

INVENTOR:
D. Wise
BY Munn & Co.
ATTORNEYS.

UNITED STATES PATENT OFFICE.

DAVID WISE, OF PARADISE, TEXAS.

SEED-PLANTER.

SPECIFICATION forming part of Letters Patent No. 277,397, dated May 8, 1883.

Application filed December 12, 1882. (No model.)

*To all whom it may concern:*

Be it known that I, DAVID WISE, of Paradise, in the county of Wise and State of Texas, have invented a new and useful Improvement in Seed-Planters, of which the following is a full, clear, and exact description.

Reference is to be had to the accompanying drawings, forming part of this specification, in which similar letters of reference indicate corresponding parts in all the figures.

Figure 4:
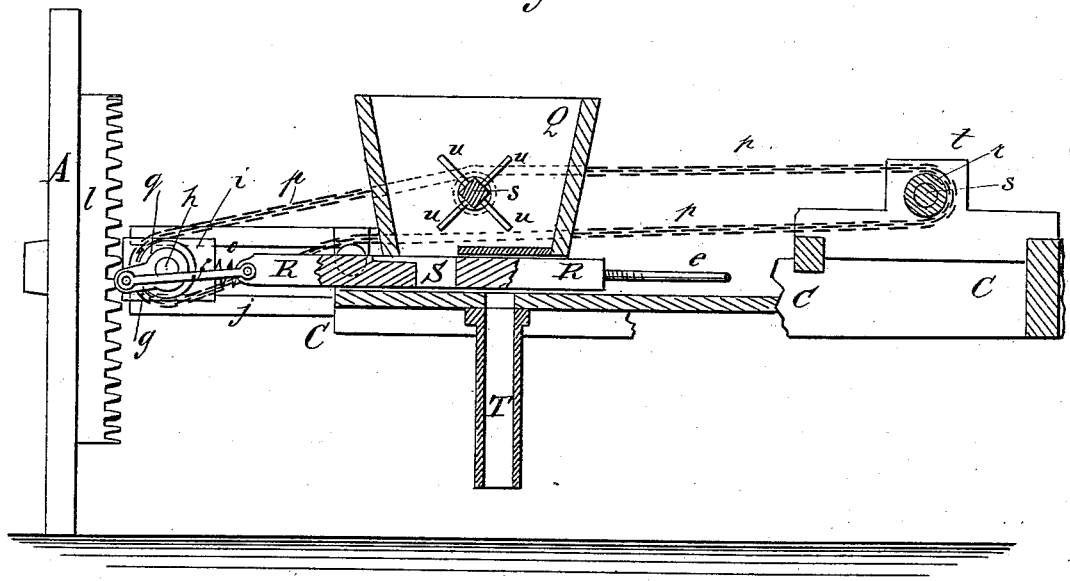
Figure 5:
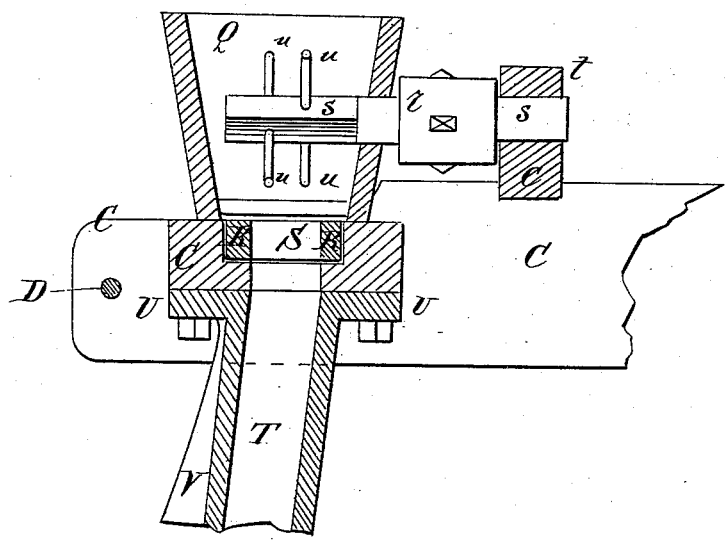

Figure 1, Sheet 1, is a plan view of my improvement. Fig. 2, Sheet 1, is a side elevation of the same, partly in section. Fig. 3, Sheet 1, is a front elevation of a part of the same enlarged, and partly in section through the line $y$ $y$, Fig. 2. Fig. 4, Sheet 2, is a front elevation of the same, partly in section, and shown as arranged for planting cotton-seed. Fig. 5, Sheet 2, is a sectional side elevation of a part of the same, shown as arranged for planting cotton-seed.

The object of this invention is to facilitate the planting of seeds, and also to promote convenience in adjusting and operating the planter.

A are the wheels of the planter, to the axle B of which is attached the rear end of the forwardly-projecting frame C. The forward ends of the side bars of the frame C project, and to them are hinged, by a long bolt, D, the rear ends of the tongue E and tongue-hounds F.

To the upper and lower sides of the rear end of the tongue E are attached the ends of a bar, G, which passes around the front cross-bar of the frame C, and has a slot, H, formed in its rear part to receive the arm of the crank I, the shaft J of which rocks in bearings attached to the frame C. To the other end of the shaft J is attached a lever, K, which projects upward in such a position that it can be readily reached and operated by the driver from his seat L. The lever K moves along an arched bar, M, attached to the frame C, and is provided with a spring-pawl, N, operated by a small elbow-lever, O, to engage with notches formed in the upper or convex side of the catch-bar M, to hold the said lever K in any position into which it may be adjusted. With this construction, by operating the lever K the machine can be adjusted to cause the plows to work at any desired depth in the ground, and to raise the plows above the ground for convenience in turning and in passing from place to place.

The driver's seat L is attached to the upper end of a standard, P, the lower end of which is attached to the axle B.

To the end parts of the front cross-bar of the frame C are attached the seed-boxes Q, beneath which are placed the seed-dropping slides R. The slides R move in a groove in the upper side of the front cross-bar of the frame C, and have holes S formed in them to receive seed from the seed-boxes Q and carry it to the apertures in the said front cross-bar of the frame C, and opening into the apertures in the upper ends of the plow-standards T, which standards have lugs U upon their upper ends to receive the bolts by which they are secured to the lower side of the front cross-bar of the frame C. The standards T are strengthened by ribs V, formed upon their forward sides.

To the forward sides of the lower ends of the standards T are attached plows W, to open furrows to receive the seed.

To the standards T, at the upper edges of the plows W, are attached forks X, the prongs of which are curved downward and outward, so as to enter the soil at the sides of the furrows and fill the said furrows with soil, covering the seed. The soil is pressed down upon the seed, and the top of the ridge is rounded by concaved rollers Y, journaled to the rear ends of standards Z, the forward ends of which have sockets $a$ formed upon them to receive the covering-teeth X, to the upper parts of which the said sockets are secured by set-screws $b$ or other suitable means. With this construction the rollers Y, when not required for use, can be readily detached and the seed covered by the action of the teeth X.

The size of the seed-receiving apertures S of the slides R is regulated by plates $c$, placed in recesses in the upper sides of the said slides, and having their inner ends bent down into the said apertures S, as shown in Fig. 3. The horizontal parts of the gage-plates $c$ are slotted to receive the fastening-screws, so that the said plates can be readily adjusted and detached. The seed-receiving apertures S of the slides R are kept from carrying out any more seed than enough to fill the said apertures by cut-off brushes $d$, attached to the seed-boxes Q in such positions as to rest upon the upper sides of the said slides, as shown in Figs. 2 and 3. The seed-dropping slides R are connected at their inner ends by a screw-rod, e, so that the said slides will move together, and so that the said slides can be adjusted at a greater or less distance apart, as may be required.

To one end of one of the slides R is hinged the end of a short connecting-rod, f, the other end of which is pivoted to a crank or crank-wheel, g, attached to the forward end of a shaft, h, revolving in bearings i, sliding in slots in arms j, secured to the side bar of the frame C.

To the shaft h is attached a small gear-wheel, k, the teeth of which mesh into the teeth of a large gear-wheel, l, attached to the spokes or hub of the drive-wheel A, so that the slides R will be vibrated to drop the seed by the revolution of the said drive-wheel A.

By varying the relative sizes of the gear-wheels k l, one, two, three, or more hills can be dropped at each revolution of the drive-wheel A.

To the sliding bearings i is attached the forked outer end of a connecting-rod, m, the inner end of which is hinged to the end of a bent foot-lever, n. The bent lever n is hinged to the frame C, and its free end projects into such a position that it can be conveniently operated by the driver with his foot to throw the gear-wheels k l out of gear. The gear-wheel k is thrown into and is held in gear with the gear-wheel l, when the foot-lever n is released, by the springs o, interposed between the bearings i and the side bar of the frame C.

When the machine is to be used for planting cotton-seed, the slides R and the cut-off brushes d are removed, and an endless chain, p, is passed around a small chain-wheel, q, attached to the shaft h, and around small chain-wheels r, attached to the shafts s, which revolve in bearings in the rear sides of the seed-boxes Q, and in bearings t, attached to the frame C, in the rear of the said seed-boxes Q.

The forward ends of the shafts s project into the seed-boxes, and to the said projecting ends are attached radial arms u, which, as the machine is drawn forward, are revolved, and thus keep the cotton-seed loose, so that it will readily pass out through the discharge-openings at the bottoms of the said seed-boxes Q.

The gear-wheel l is designed to be protected by a housing, and the planter is designed to be provided with a marker to serve as a guide to the driver, so that he can keep the machine at a proper distance from the rows last planted.

Having thus described my invention, what I claim as new, and desire to secure by Letters Patent, is—

1. In a seed-planter, the combination, with the axle B, frame C, and hinged tongue E, of the bent bar G, having slot H, the crank-shaft I J, and the lever K, substantially as herein shown and described, whereby the opening-plows can be adjusted to work at any desired depth in the ground, and can be raised from the ground, as set forth.

2. The combination, with a lever, K, and shaft J, having crank I, of the frame C, the tongue E, and the bar G, having rear slot, H, as shown and described.

3. In a seed-planter, the combination, with the sliding bearings i of the gear-wheel shaft h, of the forked rod m, the bent foot-lever n, and the springs o, substantially as herein shown and described, whereby the gear-wheels can be readily thrown out of and into gear, as set forth.

DAVID WISE.

Witnesses:
JOHN WILMER DICKERSON,
JAMES SCARBOROUGH.